United States Patent
Lu et al.

(10) Patent No.: US 9,807,101 B1
(45) Date of Patent: Oct. 31, 2017

(54) INFERRING SECURITY-SENSITIVE ENTITIES IN LIBRARIES

(71) Applicant: Oracle International Corporation, Redwood Shores, CA (US)

(72) Inventors: Yi Lu, Brisbane (AU); Padmanabhan Krishnan, Brisbane (AU); Raghavendra Kagalavadi Ramesh, Brisbane (AU); Sora Bae, Gyeonggi-do (KR)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/143,464

(22) Filed: Apr. 29, 2016

(51) Int. Cl.
*H04L 29/06* (2006.01)
*G06F 21/57* (2013.01)

(52) U.S. Cl.
CPC ............ *H04L 63/105* (2013.01); *G06F 21/57* (2013.01)

(58) Field of Classification Search
CPC ............................... H04L 63/105; G06F 21/57
See application file for complete search history.

(56) References Cited

U.S. PATENT DOCUMENTS

| | | | | |
|---|---|---|---|---|
| 7,418,734 B2* | 8/2008 | Berg | .................... | G06F 11/3604 717/106 |
| 7,577,992 B2* | 8/2009 | Abadi | ..................... | G06F 21/52 726/22 |
| 9,305,168 B2* | 4/2016 | Brucker | ................ | G06F 21/577 |
| 2005/0055565 A1* | 3/2005 | Fournet | ................. | G06F 21/577 726/26 |
| 2008/0052692 A1* | 2/2008 | Chockler | ............ | G06F 9/44589 717/151 |
| 2008/0263505 A1* | 10/2008 | StClair | ..................... | G06F 8/10 717/101 |
| 2009/0328211 A1* | 12/2009 | Abraham | ................ | G06F 21/54 726/22 |

(Continued)

OTHER PUBLICATIONS

Bagheri, Hamid et al., "COVERT: Compositional Analysis of Android Inter-App Permission Leakage", IEEE Transactions on Software Engineering, vol. 41, No. 9, Sep. 2015, pp. 866-886.*

(Continued)

*Primary Examiner* — Michael Pyzocha
(74) *Attorney, Agent, or Firm* — Osha Liang LLP (57) ABSTRACT

A method for analyzing a software library may include obtaining the software library, identifying a candidate security-sensitive entity in the software library, and generating a control flow graph that includes execution paths. Each execution path may include a public entry node corresponding to a public entry and a candidate security-sensitive entity node corresponding to the candidate security-sensitive entity. The public entry is a point where an application program external to the software library may access the software library. The method may further include determining whether each execution path in the control flow graph includes a permission check node between the respective public entry node and the candidate security-sensitive entity node in the respective execution path. Each permission check node may correspond to a permission check in the software library. The method may further include classifying, based on the determination, the candidate security-sensitive entity as a security-sensitive entity.

20 Claims, 7 Drawing Sheets

(56) References Cited

U.S. PATENT DOCUMENTS

| | | | | |
|---|---|---|---|---|
| 2012/0084759 | A1* | 4/2012 | Candea | G06F 11/3612 717/126 |
| 2013/0014090 | A1* | 1/2013 | Takahashi | G06F 11/3676 717/132 |
| 2013/0091578 | A1* | 4/2013 | Bisht | G06F 21/53 726/25 |
| 2014/0075420 | A1* | 3/2014 | Queru | G06F 9/4411 717/134 |
| 2014/0137257 | A1* | 5/2014 | Martinez | H04L 63/1433 726/25 |
| 2015/0302198 | A1* | 10/2015 | Payne | G06F 21/562 726/23 |
| 2016/0042191 | A1* | 2/2016 | Enck | G06F 21/6218 726/1 |
| 2016/0180096 | A1* | 6/2016 | Sharma | G06F 21/577 726/25 |
| 2016/0248810 | A1* | 8/2016 | Majaniemi | G06F 9/468 |
| 2017/0004303 | A1* | 1/2017 | Yan | G06F 21/56 |

OTHER PUBLICATIONS

Bartoletti, Massimo et al., "Static Analysis for Stack Inspection", Published by Elsevier Science B. V., 2001, pp. 1-12.*

Naumovich, Gleb, "A Conservative Algorithm for Computing the Flow of Permissions in Java Programs", Department of Computer and Information Science, Technical Report TR-CIS-2001-07 Dec. 21, 2001, pp. 1-18 plus cover-page 19 total pages.*

Wang, Jing et al., "HBAC: A Model for History-Based Access Control and Its Model Checking", ESORICS 2006, LNCS 4189, pp. 263-278.*

Chan, Patrick et al., "DroidChecker: Analyzing Android Applications for Capability Leak", WiSec'12, Apr. 16-18, 2012, Tucson, Arizona, USA, pp. 125-136.*

Gilbert, Peter et al., "Vision: Automated Security Validation of Mobile Apps at App Markets", MCS'11, Jun. 28, 2011, Bethesda, Maryland, USA, pp. 21-25.*

Besson, F. et al.; "From Stack Inspection to Access Control: A Security Analysis for Libraries"; 17th IEEE Computer Security Foundation Workshop, Jun. 28-30, 2004 (15 pages).

Baah, G. K. et al.; "The Probabilistic Program Dependence Graph and Its Application to Fault Diagnosis"; ACM/SIGSOFT International Symposium on Software Testing and Analysis, ISSTA, Jul. 20-24, 2008 pp. 189-200 (11 pages).

Bravenboer, M. et al.; "Strictly Declarative Specification of Sophisticated Points-to Analyses"; 24th ACM SIGPLAN Conference on Object Oriented Programming Systems Languages and Applications (OOPSLA) Oct. 25-29, 2009 pp. 243-262 (19 pages).

Fournet, C. et al.; "Stack Inspection: Theory and Variants"; 29th SIGPLAN-SIGACT Symposium on Principles of Programming Languages; Jan. 16-18, 2002; pp. 307-318 (12 pages).

Pistoia, M. et al.; "Beyond Stack Inspection: A Unified Access-Control and Information-Flow Security Model"; IEEE Symposium on Security and Privacy, 2007; pp. 149-163 (15 pages).

Ramalingam, G.; "Data Flow Frequency Analysis"; ACM SIGPLAN '96 Conference on Programming Language and Design and Implementation (PLDI), May 1996; pp. 267-277 (11 pages).

Wu, Y. et al.; "Static Branch Frequency Program Profile Analysis"; 27th Annual International Symposium on Microarchitecture; 1994; pp. 1-11 (11 pages).

Wallach, D. S. et al.; "Understanding Java Stack Inspection"; IEEE Symposium on Security and Privacy; May 3-6, 1998, pp. 52-63 (12 pages).

Pistoia, M. et al.; "Interprocedural Analysis for Privileged Code Placement and Tainted Variable Detection"; 2005 European Conference on Object-Oriented Programming, ECOOP; 2005, pp. 362-386 (25 pages).

Oracle. "Permissions in the Java Development Kit (JDK)", 2014, http://docs.oracle.com/javase/8/docs/technotes/guides/security/permissions.html.

Oracle. "Secure Coding Guidelines for Java SE.", Apr. 2014; http://www.oracle.com/technetwork/java/seccodeguide-139067.html.

Cifuentes, C. et al.; "Transitioning Parfait into a Developmental Tool"; IEEE Security and Privacy, May/Jun. 2012; 10(3): pp. 16-23 (8 pages).

* cited by examiner

INFERRING SECURITY-SENSITIVE ENTITIES IN LIBRARIES

BACKGROUND

Modern programming languages such as Java and C# use permission checks as an access control mechanism to protect security-sensitive entities from public access. This access control is typically enforced dynamically by examining the runtime call-stack to check whether every caller on the stack has the required permissions. This mechanism ensures that when untrusted code invokes trusted code, the untrusted code cannot indirectly access items via the trusted code.

However, in certain situations untrusted code does need limited access to the restricted information. To enable this access, some programming languages provide a mechanism to permit untrusted code to access restricted entities in a "safe manner" (e.g., via a doPrivileged( ) method in Java) that effectively allows untrusted code to invoke a trusted intermediary that accesses the restricted entity on behalf of the untrusted code. This results in elevation of privileges for the untrusted code via the intermediary. Both the permission checks and privilege elevations are specified programmatically and there is no formal specification of the restricted entities or privilege elevations. When design intent is not documented either formally or informally, it is easy to lose sight of the implicit security requirements while revising the code. Hence the programmer is solely responsible for the enforcement of the desired, but not explicitly specified, security properties. This could potentially lead to security weaknesses and vulnerabilities. Detection of security-related programming errors becomes difficult as there is no clear specification of acceptable and unacceptable program behavior. The situation is even more difficult for software libraries which are expected to enforce security for all possible programs (which are unknown) that use the library. Currently there is no existing tool that can automatically identify security-sensitive entities.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for analyzing a software library including obtaining the software library, identifying a candidate security-sensitive entity in the software library, and generating a control flow graph that includes execution paths. Each execution path includes a public entry node corresponding to a public entry and a candidate security-sensitive entity node corresponding to the candidate security-sensitive entity. The public entry is a point where an application program external to the software library accesses the software library. The method further includes determining whether each execution path in the control flow graph includes a permission check node between the respective public entry node and the candidate security-sensitive entity node in the respective execution path. Each permission check node corresponds to a permission check in the software library. The method further includes classifying, based on the determination, the candidate security-sensitive entity as a security-sensitive entity.

In general, in one aspect, one or more embodiments relate to a system including a processor and a memory including instructions that, when executed by the processor, cause the processor to obtain the software library, identify a candidate security-sensitive entity in the software library, and generate a control flow graph that includes execution paths. Each execution path includes a public entry node corresponding to a public entry and a candidate security-sensitive entity node corresponding to the candidate security-sensitive entity. The public entry is a point where an application program external to the software library accesses the software library. The instructions further include determining whether each execution path in the control flow graph further comprises a permission check node between the respective public entry node and the candidate security-sensitive entity node in the respective execution path. Each permission check node corresponds to a permission check in the software library. The instructions further include classifying, based on the determination, the candidate security-sensitive entity as a security-sensitive entity. The system further includes a repository, configured to store at least the software library and the application program.

In general, in one aspect, one or more embodiments of the invention relate to a non-transitory computer readable medium including instructions that, when executed by a processor, perform a method for analyzing a software library including obtaining the software library, identifying a candidate security-sensitive entity in the software library, and generating a control flow graph that includes execution paths. Each execution path includes a public entry node corresponding to a public entry and a candidate security-sensitive entity node corresponding to the candidate security-sensitive entity. The public entry is a point where an application program external to the software library accesses the software library. The method further includes determining whether each execution path in the control flow graph includes a permission check node between the respective public entry node and the candidate security-sensitive entity node in the respective execution path. Each permission check node corresponds to a permission check in the software library. The method further includes classifying, based on the determination, the candidate security-sensitive entity as a security-sensitive entity.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system and non-transitory computer readable medium for analyzing a software library. In particular, one or more embodiments are directed to a method that identifies candidate security-sensitive entities (e.g., methods and read/write fields in objects) and their required permissions in a software library that relies on permission checks to enforce access control. The method is based on analyzing the usage of candidate security-sensitive entities in the software library relative to permission checks. The method may generate a control flow graph representing execution paths between a public entry and a candidate security-sensitive entity. False positives may be reduced by requiring that candidate security-sensitive entities be guarded by permission checks within a predetermined proximity in the various execution paths of the control flow graph. It may also be useful to filter candidate security-sensitive entities using probabilistic factors representing the likelihood of the candidate security-sensitive entity being guarded by permission checks in the various execution paths of the control flow graph. Access control errors representing potentially dangerous security vulnerabilities may be identified when coverage of the security-sensitive entity by permission checks does not occur in all execution paths of the control flow graph reaching the security-sensitive entity. The method may be useful, for example, in taint and escape analyses, which require determining whether security-sensitive entities are guarded by appropriate permission checks.

Figure 1A:
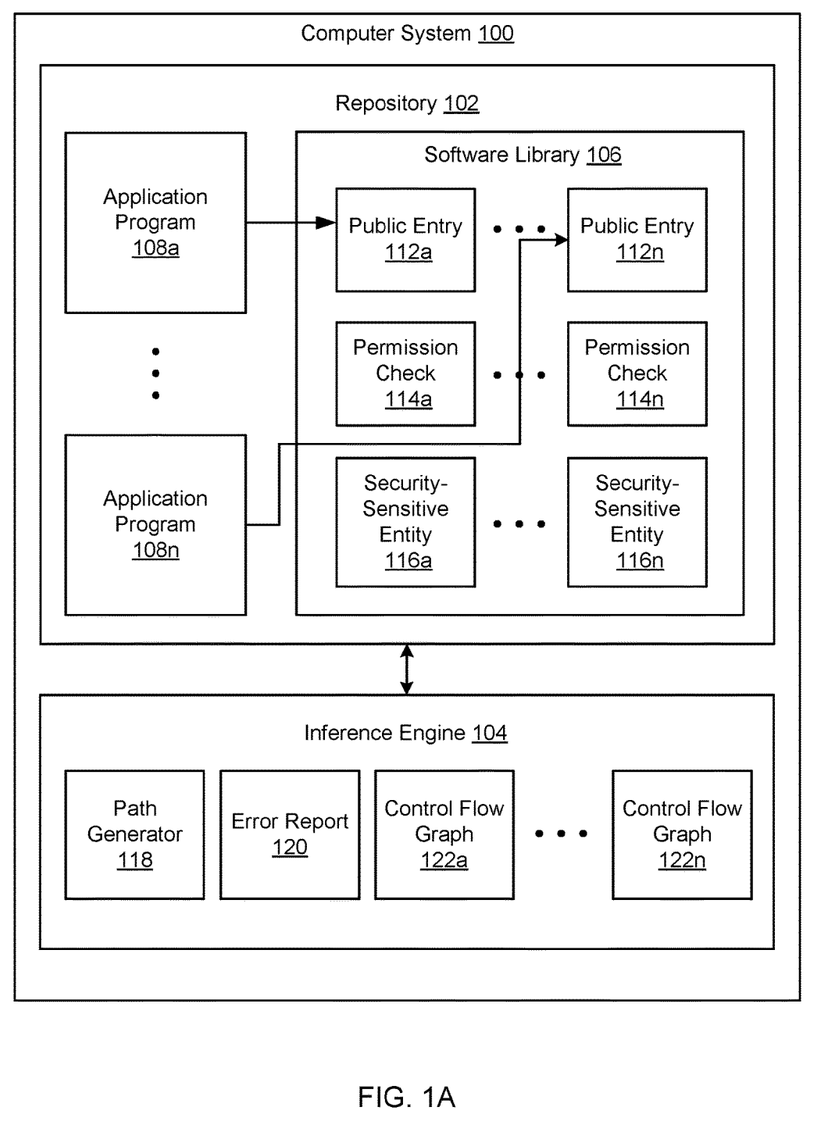
FIG. 1A and FIG. 1B show systems in accordance with one or more embodiments of the invention.

FIG. 1A shows a system in accordance with one or more embodiments of the invention. As shown in FIG. 1A, the system includes a computer system (100) that includes a repository (102) and an inference engine (104). In one or more embodiments, the computer system (100) may be the computing system (500) described with respect to FIG. 5A and the accompanying description below, or may be the client device (526) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a software library (106) and one or more application programs (108a-108n). In one or more embodiments of the invention, both the software library (106) and application programs (108a-108n) are collections of source code including various software components. That is, the software library (106) and application programs (108a-108n) may be collections of computer instructions written in a human-readable programming language. The software library (106) and application programs (108a-108n) may be transformed by a compiler program into binary machine code. Compiled machine code may then be executed by a processor in order to execute the software components generated from the software library (106) and/or application programs (108a-108n).

In one or more embodiments of the invention, the software library (106) may include one or more public entries (112a-112n), permission checks (114a-114n), and security-sensitive entities (116a-116n). A public entry (112a-112n) may be a point in the software library (106) where an application program (108a-108n) external to the software library (106) accesses the software library (106). For example, public entries (112a-112n) may include functions, classes, objects and/or methods exposed by an application programming interface (API) of the software library (106). A permission check (114a-114n) may be a statement that checks whether an access request indicated by a specified permission should be granted or denied. The permission may control access to a specific resource. A resource may have multiple associated permissions. For example, a file may have "read", "write" and "execute" permissions, and a host may have a "connect" permission.

Two different permission checks (114a-114n) may be equivalent when they check the same permission. Determining whether two permission checks (114a-114n) are equivalent may require analysis when the permissions result from a computation (e.g., the type of access may be represented as a variable whose value may be "read" or "write" depending on the result of a conditional statement). Furthermore, the entity to which the permission applies may also be the result of a computation. In one or more embodiments, the various execution paths leading to the permission computations may be analyzed in order to determine when different permission checks (114a-114n) are equivalent.

Security-sensitive entities (116a-116n) may be designed to be guarded by specific permission checks (114a-114n) to prevent unrestricted public access. A security-sensitive entity (116a-116n) may be a computational entity (e.g., a method, function, object, or field of an object) with access to privileged resources and operations (e.g., reading and/or modifying a file containing security-sensitive data). In one or more embodiments, a public entry (112a-112n) may be a candidate (i.e., potential) security-sensitive entity (116a-116n) when the public entry (112a-112n) itself (e.g., a public API method) contains a permission check (114a-114n). In contrast, any internal (i.e., not publicly accessible) method of the software library (106) may be a candidate security-sensitive entity (116a-116n). An internal method may be classified as an actual security-sensitive entity (116a-116n) when the internal method contains a permission check (114a-114n) on each execution path from a public entry (112a-112n) to the internal method, where the permission check (114a-114n) is outside the lexical scope of a privilege elevation statement or block (e.g., a doPrivileged( ) call in Java). In addition, a field in an object of the software library (106) that is not directly accessible by an application program (108a-108n) may be a security-sensitive entity (116a-116n) when each execution path from a public entry (112a-112n) to each statement accessing (e.g., reading or writing) the field contains a permission check (114a-114n).

Continuing with FIG. 1A, in one or more embodiments, the system (100) includes the inference engine (104). The inference engine (104) may be implemented in hardware (i.e., circuitry), software, or any combination thereof. The inference engine (104) may include a path generator (118), an error report (120), and control flow graphs (122a-122n). The path generator (118) may include functionality to generate a control flow graph (122a-122n) to represent the flow of control through various execution paths including the methods and/or functions of the software library (106). In one or more embodiments, the control flow graph (122a-122n) includes all execution paths starting at a public entry (112a-112n) and ending at a candidate security-sensitive entity (116a-116n). In one or more embodiments, a control flow graph (122a-122n) may be generated for the entire software library (106) and may include multiple candidate security-sensitive entities (116a-116n). In one or more embodiments, a control flow graph (122a-122n) may be generated for each candidate security-sensitive entity (116a-116n), in order to reduce the scale of the analysis.

Figure 1B:
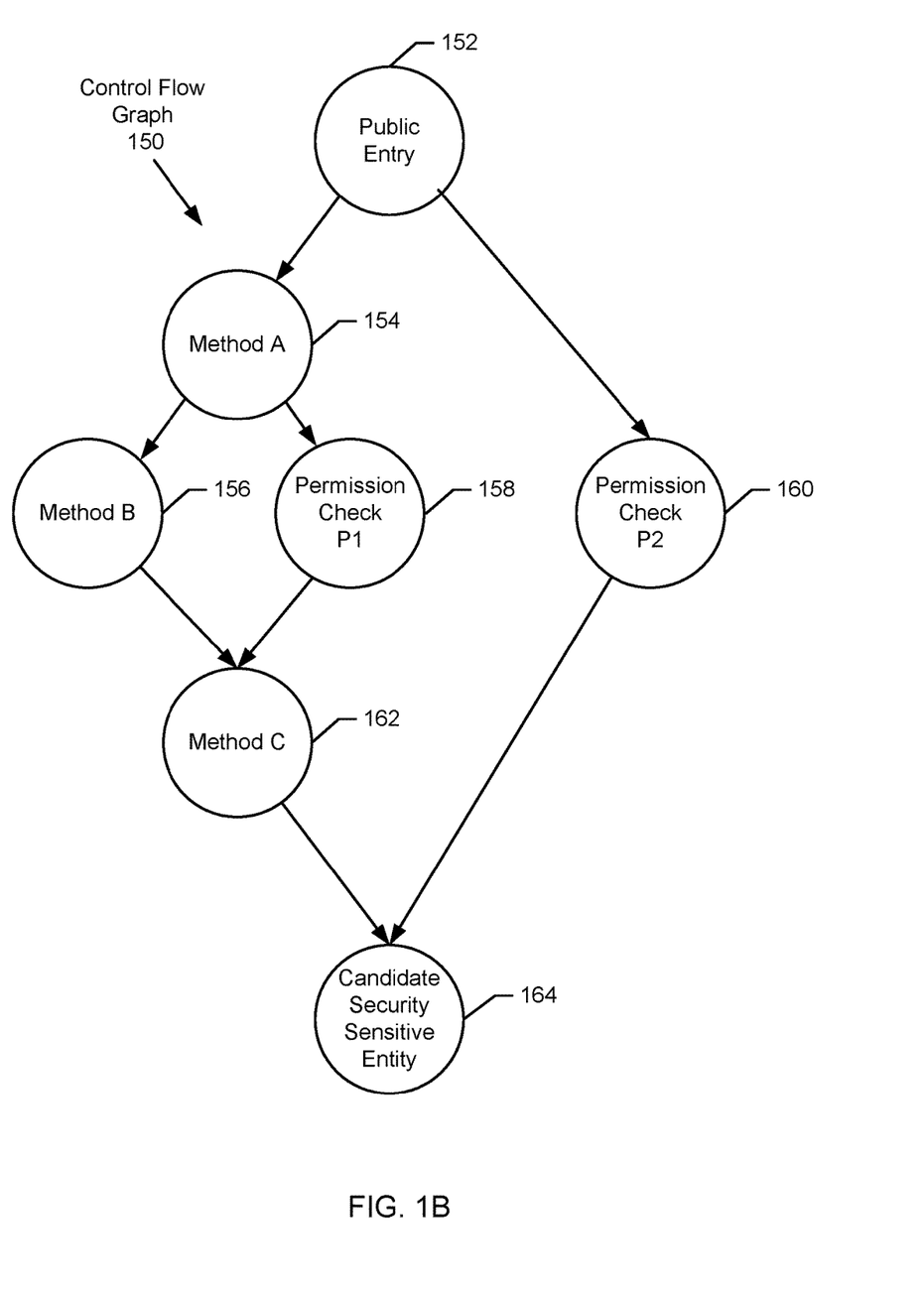

The control flow graph (122a-122n) may include one or more nodes corresponding to methods and/or functions, where the flow of invocations among the methods and/or functions is indicated via direct edges between nodes. FIG. 1B illustrates a control flow graph (150). For example, the public entry node (152) is connected via a direct edge to the method A node (154), indicating that the public entry method invokes method A.

Returning to FIG. 1A, the inference engine (104) may include functionality to identify candidate security-sensitive entities (116a-116n) based on their relationships to permission checks (114a-114n) in the context of method or function invocations in a control flow graph (122a-122n). These relationships may include both the proximity and coverage of the security-sensitive entity (116a-116n) relative to permission checks (114a-114n). That is, a candidate security-sensitive entity (116a-116n) may be classified as a security-sensitive entity (116a-116n) if it is consistently guarded (covered) by a permission check (114a-114n) for a specific permission within a certain proximity in a control flow graph (122a-122n). The concepts of proximity and coverage are described below.

The concept of proximity may be used to avoid false positives when identifying candidate security-sensitive entities (116a-116n) in the software library (106). Proximity is dynamic, rather than lexical. For example, it may be the case that a permission check (114a-114n) guarding a security-sensitive entity (116a-116n) appears to be inadvertently guarding another entity (e.g., method, object or field) near the security-sensitive entity (116a-116n) within the code of the software library (106). For example, an inadvertently protected entity may be the statement immediately following a permission check (114a-114n) in a method or function of the software library (106). Such inadvertently protected entities may be filtered out using the following definition of proximity that is based on the premise that checking permissions is not lexically scoped. That is, lexical proximity to a permission check (114a-114n) is not a sufficient basis for classifying an entity as a security-sensitive entity (116a-116n), and in fact may lead to false positives.

A proximity level is defined to be the number of invocations in the control flow graph (122a-122n) from the permission check (114a-114n) to the candidate security-sensitive entity (116a-116n). This definition of proximity level is a dynamic proximity of a candidate security-sensitive entity (116a-116n) relative to a permission check (114a-114n) in the context of a chain of invocations. Then, relative to a threshold proximity level, a permission check (114a-114n) may guard only some candidate security-sensitive entities (116a-116n) within the threshold proximity level. Therefore, using a proximity level based on the number of invocations in the control flow graph (122a-122n), an inadvertently protected entity may be filtered out.

For example, FIG. 1B shows a control flow graph (150) that includes a public entry node (152), permission check nodes (158, 160) and a candidate security-sensitive entity node (164). As shown in FIG. 1B, each execution path in the control flow graph (150) begins at the public entry node (152) and ends at the candidate security-sensitive entity node (164). The candidate security-sensitive entity node (164) has a proximity level of 2 relative to the permission check P1 node (158), since there is 1 intervening node (method C (162)) between the candidate security-sensitive entity node (164) and the permission check P1 node (158). Similarly, the candidate security-sensitive entity node (164) has a proximity level of 1 relative to the permission check P2 node (160), since there are no nodes between the candidate security-sensitive entity node (164) and the permission check P2 node (160). In one or more embodiments, there may be multiple public entry nodes within a control flow graph (150).

In one or more embodiments, the permission checks (114a-114n) in the software library (106) provide the basis for identifying security-sensitive entities (116a-116n). However, if a programmer mistakenly omits a permission check (114a-114n) on an execution path in the control flow graph (122a-122n), then a candidate security-sensitive entity (116a-116n) may be overlooked. Therefore, the inference engine (104) may contain functionality to detect such potential access control errors and issue an error report (120) (e.g., for review by a programmer developing or maintaining the software library (106)) indicating the security-sensitive entity (116a-116n) and the execution path in the control flow graph (122a-122n) lacking the permission check (114a-114n).

In one or more embodiments, the concept of coverage may be used in the identification of candidate security-sensitive entities (116a-116n) in the software library (106). A coverage level represents a probability that a candidate security-sensitive entity (116a-116n) is guarded by permission checks (114a-114n) in the execution paths leading to the candidate security-sensitive entity (116a-116n). In one or more embodiments, the inference engine (104) may include functionality to calculate a coverage level by analyzing the execution paths of a control flow graph (122a-122n). In one or more embodiments, a candidate security-sensitive entity (116a-116n) may be classified as a security-sensitive entity (116a-116n) when its coverage level exceeds a certain value. In one or more embodiments, the coverage level may be based on probabilistic factors assigned to nodes in a control flow graph (122a-122n) that corresponds to a permission check (114a-114n) for a specific permission. In other words, the coverage level measures the probability of executing a permission check (114a-114n) prior to reaching the candidate security-sensitive entity (116a-116n).

While FIG. 1A shows a configuration of components, other configurations may be used without departing from the scope of the invention. For example, various components may be combined to create a single component. As another example, the functionality performed by a single component may be performed by two or more components.

Figure 2:
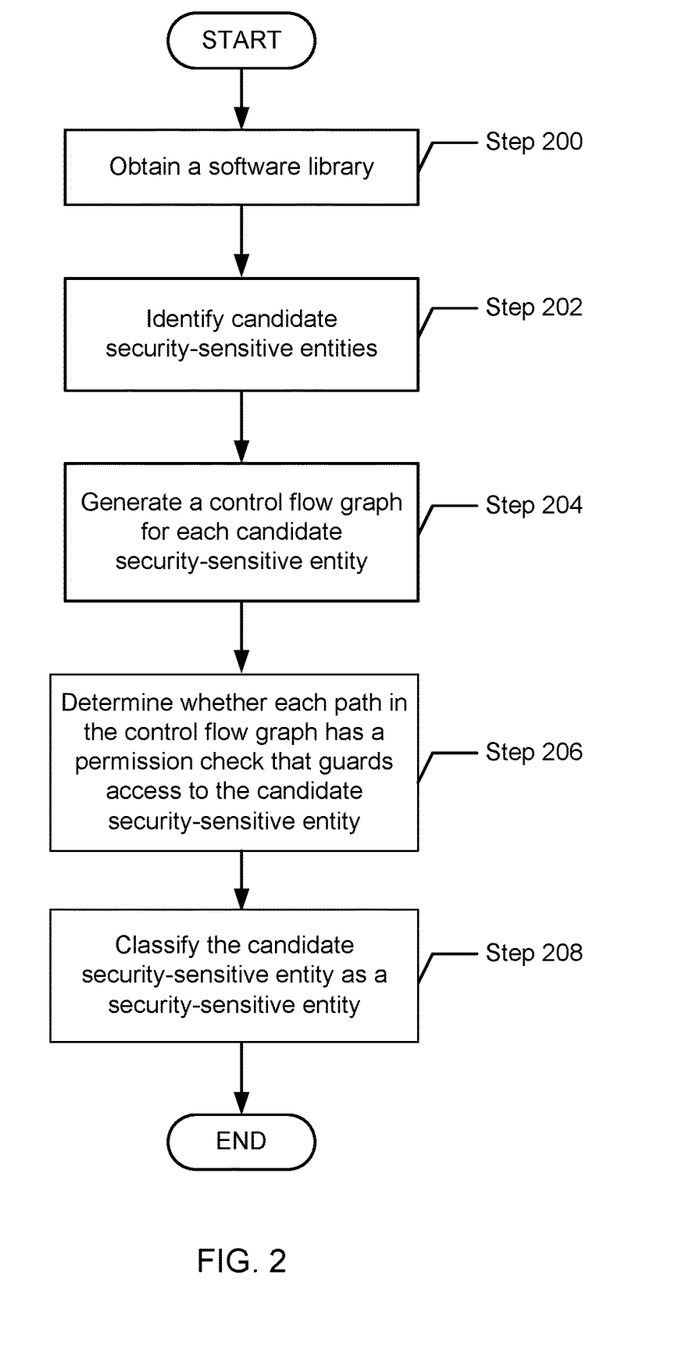
FIG. 2 shows a flowchart in accordance with one or more embodiments of the invention.

FIG. 2 shows a flowchart in accordance with one or more embodiments of the invention. The flowchart depicts a process for analyzing a software library. One or more of the steps in FIG. 2 may be performed by the components of the computer system (100), discussed above in reference to FIG. 1A. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, a software library is obtained. For example, the software library may be obtained from a repository.

In Step 202, candidate security-sensitive entities in the software library are identified. For example, a candidate security-sensitive entity may be a public entry (e.g., a public API method) that includes a permission check. Alternatively, a candidate security-sensitive entity may be inaccessible by application programs external to the software library (e.g., a private or restricted method or field).

In Step 204, a control flow graph is generated for a candidate security-sensitive entity. The control flow graph represents the possible execution paths leading to the candidate security-sensitive entity. Each path in the control flow graph may connect a public entry node corresponding to a public entry and a candidate security-sensitive entity node corresponding to the candidate security-sensitive entity. Each public entry may be a point in the software library where an application program external to the software library accesses the software library. Standard program analysis techniques may be used during the generation of the control flow graph (e.g., points-to analysis, as in Martin Bravenboer and Yannis Smaragdakis, Strictly declarative specification of sophisticated points-to analyses, Proceedings of the 24th ACM SIGPLAN conference on Object-oriented programming systems languages and applications (OOPSLA), pages 243-262, ACM, 2009, and standard data flow algorithms, as in Flemming Nielson, Hanne Riis Nielson, and Chris Hankin, Principles of Program Analysis, Springer, 2nd edition, 1999).

In Step 206, it is determined whether each execution path in the control flow graph includes a permission check node corresponding to a permission check that guards access to the candidate security-sensitive entity, where the permission check node is between a public entry node and the candidate security-sensitive entity node. This may be accomplished using standard graph analysis and inter-procedural dependence analysis techniques. For example, the control flow graph may be traversed, starting with the candidate security-sensitive entity node until a public entry node is reached, noting any permission checks encountered during the traversal. In one or more embodiments, the various permission check nodes are analyzed to determine whether they correspond to equivalent permissions (e.g., when permissions result from complex computations). In one or more embodiments, each permission check may be located outside the lexical scope of any privilege elevation statement.

In Step 208, the candidate security-sensitive entity may be classified as a security-sensitive entity, depending on the determination performed in Step 206 above. That is, if each execution path in the control flow graph includes a permission check node between a public entry node and the candidate security-sensitive entity node, then the candidate security-sensitive entity may be classified as a security-sensitive entity.

Those skilled in the art will understand that Step 204, Step 206 and Step 208 of FIG. 2 may be executed for each candidate security-sensitive entity identified in Step 202.

Figure 3A:
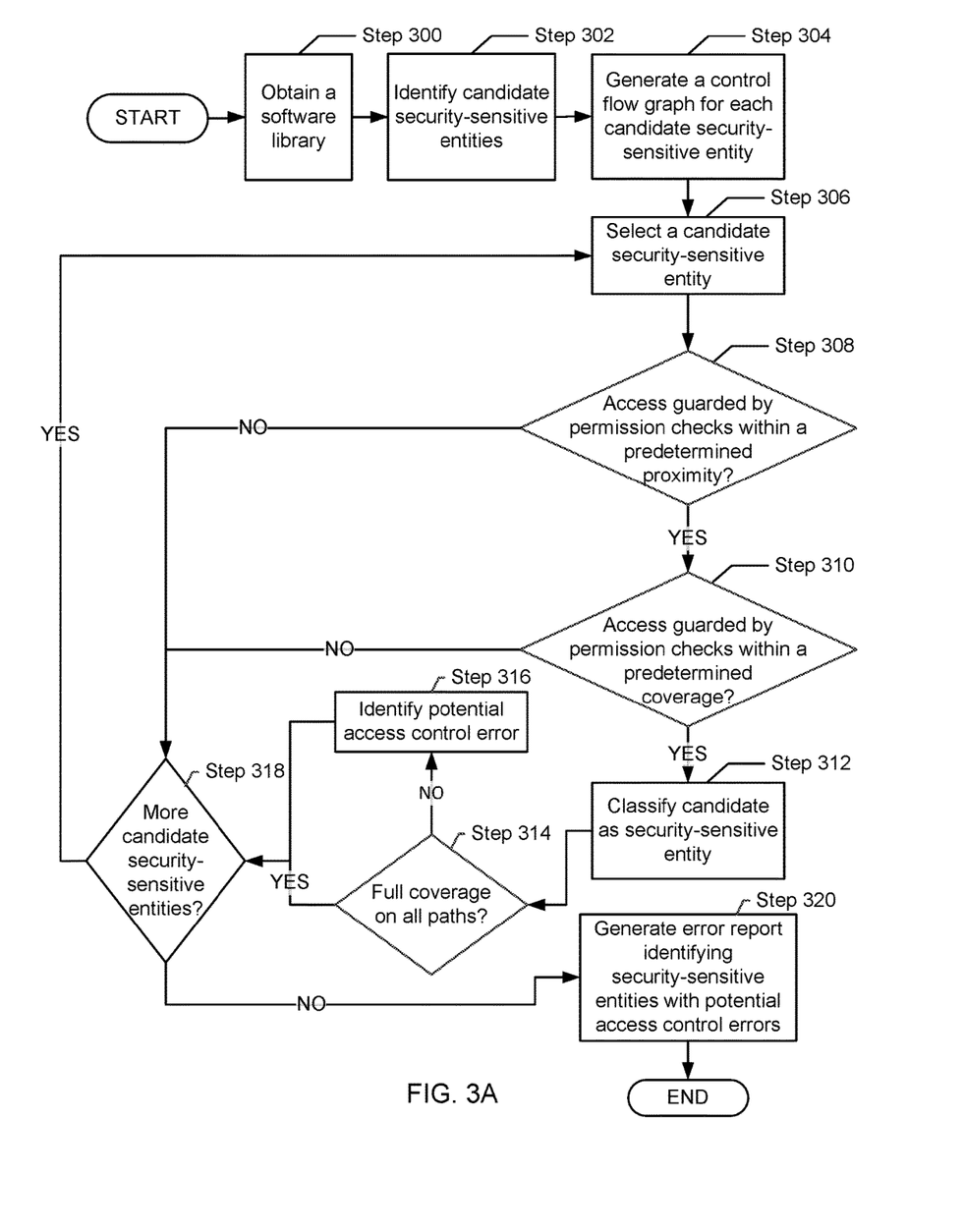
FIG. 3A and FIG. 3B show flowcharts in accordance with one or more embodiments of the invention.

FIG. 3A shows a flowchart in accordance with one or more embodiments of the invention. The flowchart depicts a process, in more detail than FIG. 2, for analyzing a software library. One or more of the steps in FIG. 3A may be performed by the components of the computer system (100), discussed above in reference to FIG. 1A. In one or more embodiments of the invention, one or more of the steps shown in FIG. 3A may be omitted, repeated, and/or performed in a different order than the order shown in FIG. 3A. Accordingly, the scope of the invention should not be considered limited to the specific arrangement of steps shown in FIG. 3A.

Initially, in Step 300, a software library is obtained, as previously described in Step 200.

In Step 302, candidate security-sensitive entities in the software library are identified, as previously described in Step 202.

In Step 304, a control flow graph is generated for a candidate security-sensitive entity, as previously described in Step 204.

In Step 306, a candidate security-sensitive entity is selected. In particular, a candidate security-sensitive entity from the candidate security-sensitive entities identified in Step 302 may be selected automatically by a computing system. If selected by the computing system, a software application may select the candidate security-sensitive entity using a software algorithm, e.g., a pseudorandom algorithm or in an iterative manner. On the other hand, if selected by a user, the user may designate the candidate security-sensitive entity from the candidate security-sensitive entities identified in Step 302. Thus, a software program may obtain a selection of the candidate security-sensitive entity from the user, e.g., via a graphical user interface.

In Step 308, it is determined whether the selected candidate security-sensitive entity is guarded by permission checks within a predetermined proximity level. In one or more embodiments, a proximity level may be calculated based on the number of nodes in the execution paths of the control flow graph between each permission check node and the selected candidate security-sensitive entity node. In one or more embodiments, the calculated proximity level may be an average proximity level relative to multiple execution paths in the control flow graph from a public entry node to the selected candidate security-sensitive entity node. In one or more embodiments, statistical methods may be applied to evaluate the proximity level relative to the various execution paths of the control flow graph.

If the selected candidate security-sensitive entity is guarded by permission checks within the predetermined proximity level, then Step 310 below is performed. Otherwise, the candidate security-sensitive entity is rejected, and Step 318 below is performed.

In Step 310, it is determined whether the selected candidate security-sensitive entity is guarded by permission checks within a predetermined coverage level. The coverage level may represent the probability of the candidate security-sensitive entity being guarded by a permission check in the execution paths of the control flow graph. In one or more embodiments, the coverage level may be based on probabilistic factors assigned to each permission check node in the control flow graph.

If the selected candidate security-sensitive entity is guarded by permission checks within the predetermined coverage level, then the selected candidate security-sensitive entity is classified as a security-sensitive entity in Step 312, and Step 314 below is performed. Otherwise, the candidate security-sensitive entity is rejected, and Step 318 below is performed.

Therefore, the number of candidate security-sensitive entities classified as security-sensitive entities depends on both the predetermined coverage level and predetermined proximity level.

In Step 314, if the security-sensitive entity has full coverage on all execution paths in the control flow graph, then Step 318 below is performed. Full coverage means that the security-sensitive entity is guarded by a permission check in each execution path of the control flow graph that reaches the security-sensitive entity node. Otherwise, in the absence of full coverage, Step 316 identifies a potential access control error indicating the security-sensitive entity and the permission that is not fully covered relative to the security-sensitive entity. That is, a potential access control error exists when a security-sensitive entity is not completely guarded by permission checks in all execution paths of the control flow graph that reach the security-sensitive entity.

In Step 318, if there are additional candidate security-sensitive entities that have not been analyzed, then Step 306 above is again performed and the analysis continues with another candidate security-sensitive entity. Otherwise, all candidate security-sensitive entities have already been analyzed, and an error report is generated in Step 320, identifying the security-sensitive entities with any access control errors that were identified in Step 316 above. In one or more embodiments, the error report may indicate each execution path in which a security-sensitive entity is unguarded by a permission check. The number of potential access control errors detected may depend on the predetermined coverage level. The error report may be used by a software library developer or maintainer to determine whether the absence of permission checks was intended or accidental. The error report may be presented in a display device, such as in a graphical user interface (GUI).

In one or more embodiments, after performing the method of FIG. 3A, it may be desirable to re-perform the method with adjusted proximity and coverage levels, if too many or too few security-sensitive entities are identified.

Figure 3B:
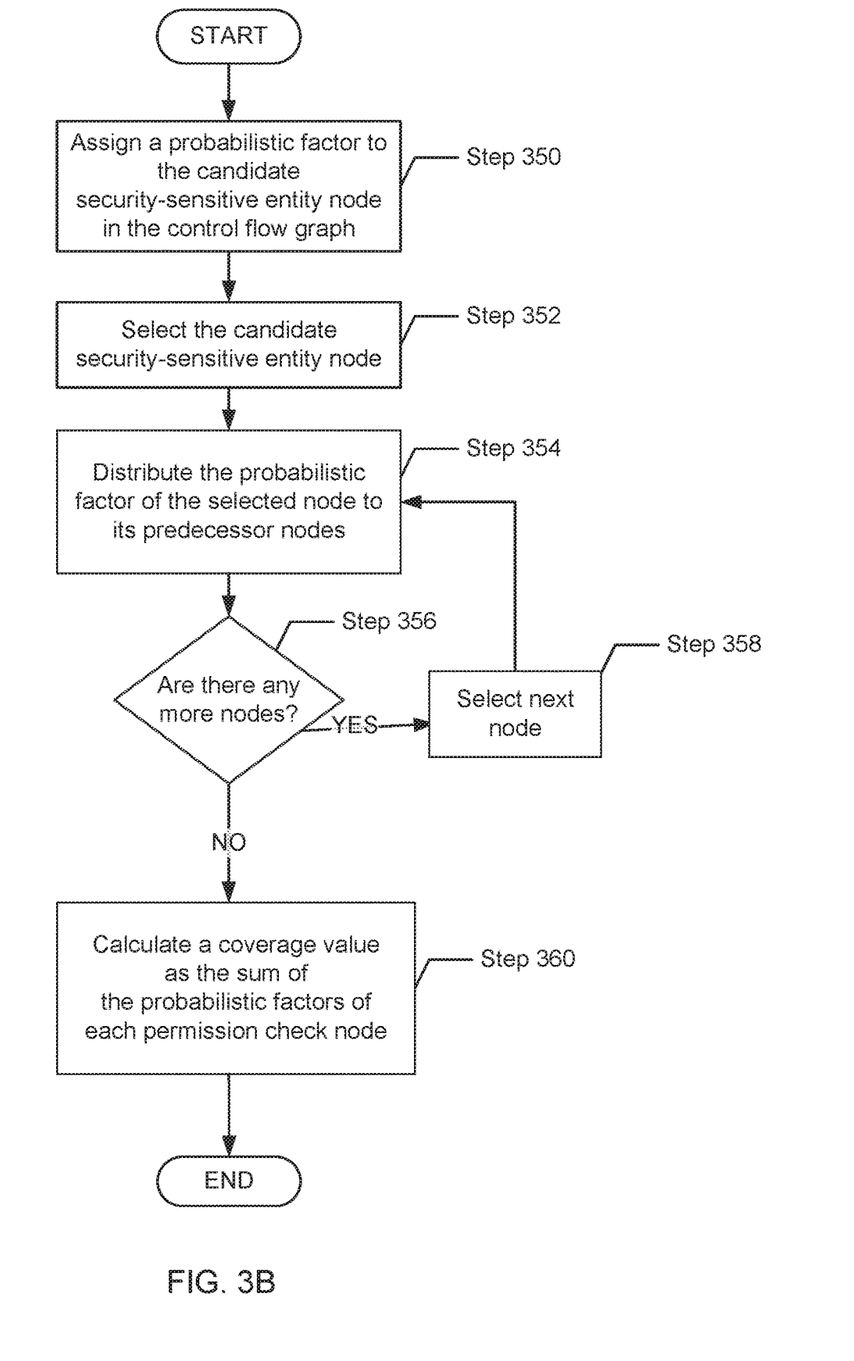

FIG. 3B shows a flowchart in accordance with one or more embodiments of the invention. The flowchart depicts a process for analyzing a software library. Moreover, the flowchart in FIG. 3B may relate to Step 310 in FIG. 3A, where the coverage level of a candidate security-sensitive entity is computed relative to a permission check. One or more of the steps in FIG. 3B may be performed by the components of the system (100), discussed above in reference to FIG. 1A. In one or more embodiments of the invention, one or more of the steps shown in FIG. 3B may be omitted, repeated, and/or performed in a different order than the order shown in FIG. 3B. Accordingly, the scope of the invention should not be considered limited to the specific arrangement of steps shown in FIG. 3B.

Initially, in Step 350, the node in the control flow graph corresponding to the candidate security-sensitive entity is assigned a probabilistic factor (e.g., a probabilistic factor of 1). In one or more embodiments, the assignment of probabilistic factors flows backwards starting from the candidate security-sensitive entity node. This is because the various probabilistic factors represent conditional probabilities of the execution of various nodes in the control flow graph (most importantly, permission check nodes), based on the assumption that the candidate security-sensitive entity node is executed.

In Step 352, the node corresponding to the candidate security-sensitive entity is selected. This selection initializes the iteration loop comprising Step 354, Step 356 and Step 358 below.

In Step 354, the probabilistic factor of the selected node is distributed to each predecessor node (if any) of the selected node. In one or more embodiments, each predecessor node may be connected to the selected node via a direct edge in the control flow graph. For example, if the selected node has a probabilistic factor x and the selected node has k predecessor nodes, then a probabilistic factor of x/k may be assigned to each predecessor node. In one or more embodiments, each branch of the control flow graph is assumed to be equally likely, and therefore the probabilistic factor of the selected node may be uniformly divided among the respective predecessor nodes. In one or more embodiments, contextual information and/or previous performance results may be leveraged to provide a more informed (e.g., non-uniform) distribution of probabilistic factors among the respective predecessor nodes.

TABLE 1

Probabilistic Factors

| Node | Probabilistic Factor |
| --- | --- |
| Permission Check P2 | .5 |
| Method C | .5 |
| Permission Check P1 | .25 |
| Method B | .25 |
| Method A | .5 |

For example, the probabilistic factor (e.g., a probabilistic value of 1) of the candidate security-sensitive entity node (164) of FIG. 1B may be divided equally among its predecessor nodes corresponding to permission check P2 (160) and method C (162), which are both assigned a probabilistic factor of 0.5, as shown in Table 1 above, which shows the probabilistic factors assigned to the interior nodes of FIG. 1B. Next the probabilistic factor of method C (162) is divided equally among its predecessor nodes corresponding to permission check P1 (158) and method B (156), which are both assigned a probabilistic factor of 0.25, also shown in Table 1.

In one or more embodiments, when distributing a probabilistic factor f of a selected node to its predecessor nodes, if a predecessor node has already been assigned a probabilistic factor g, then f is added to the already assigned probabilistic factor g.

In one or more embodiments, the probabilistic factor assigned to each node n may be constrained to be the sum of the probabilistic factors assigned to its successor nodes that are connected via a direct edge to node n. For example, in FIG. 1B, the probabilistic factor of the node corresponding to method A (154) is the sum of the probabilistic factors of its successor nodes corresponding to method B (156) and permission check P1 (158). Therefore, the node corresponding to method A (154) is assigned a probabilistic factor of 0.5, as shown in Table 1.

In Step 358, another node is selected, if in Step 356 it is determined that there is at least one additional node in the control flow graph whose probabilistic factor has not yet been distributed to its predecessor nodes. Then, Step 354 is again performed on the newly selected node. Otherwise, if all remaining nodes have had their probabilistic factors distributed to their predecessor nodes, Step 360 below is performed. In one or more embodiments, the nodes of the control flow graph may be examined in various sequences (e.g., via a breadth-first or depth-first traversal of the nodes in the control flow graph).

In Step 360, the coverage level is calculated as the sum of the probabilistic factors of the nodes in the control flow graph corresponding to permission checks. This is because the coverage level is defined as the probability of a permission check guarding a candidate security-sensitive entity. For example, to obtain the coverage level for the candidate security-sensitive entity node (164) of FIG. 1B with respect to permission p, we add the probabilistic factors of all permission check nodes in execution paths from the public entry node (152) to the candidate security-sensitive entity node (164). In FIG. 1B, there are two such execution paths. One execution path passes through the node corresponding to permission check P1 (158), which has a probabilistic factor of 0.25. The other execution path passes through the node corresponding to permission check P2 (160), which has a probabilistic factor of 0.5. Therefore, the coverage level for the candidate security-sensitive entity node (164) with respect to permission p is 0.75.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

The methods described herein, based on analyzing patterns in a control flow graph, have been used to infer a relationship between two related programming constructs used in a software library, in this case, between security-sensitive entities and permission checks, where the degree of the relationship may depend on proximity and coverage levels. In other embodiments, the methods described herein may be similarly used to infer a relationship or pattern among other programming constructs used in a codebase, where the degree of the relationship may similarly depend on proximity and coverage levels. In such scenarios, potential errors may be detected and reported based on deviations from expected patterns (e.g., a lack of coverage of one programming construct by another programming construct on an execution path in a control flow graph). The methods described herein may be useful in detecting and enforcing various programming patterns and/or rules (e.g., safe pointer rules, rules to prevent memory leaks, rules to prevent code "hot spots", etc.).

Figure 4:
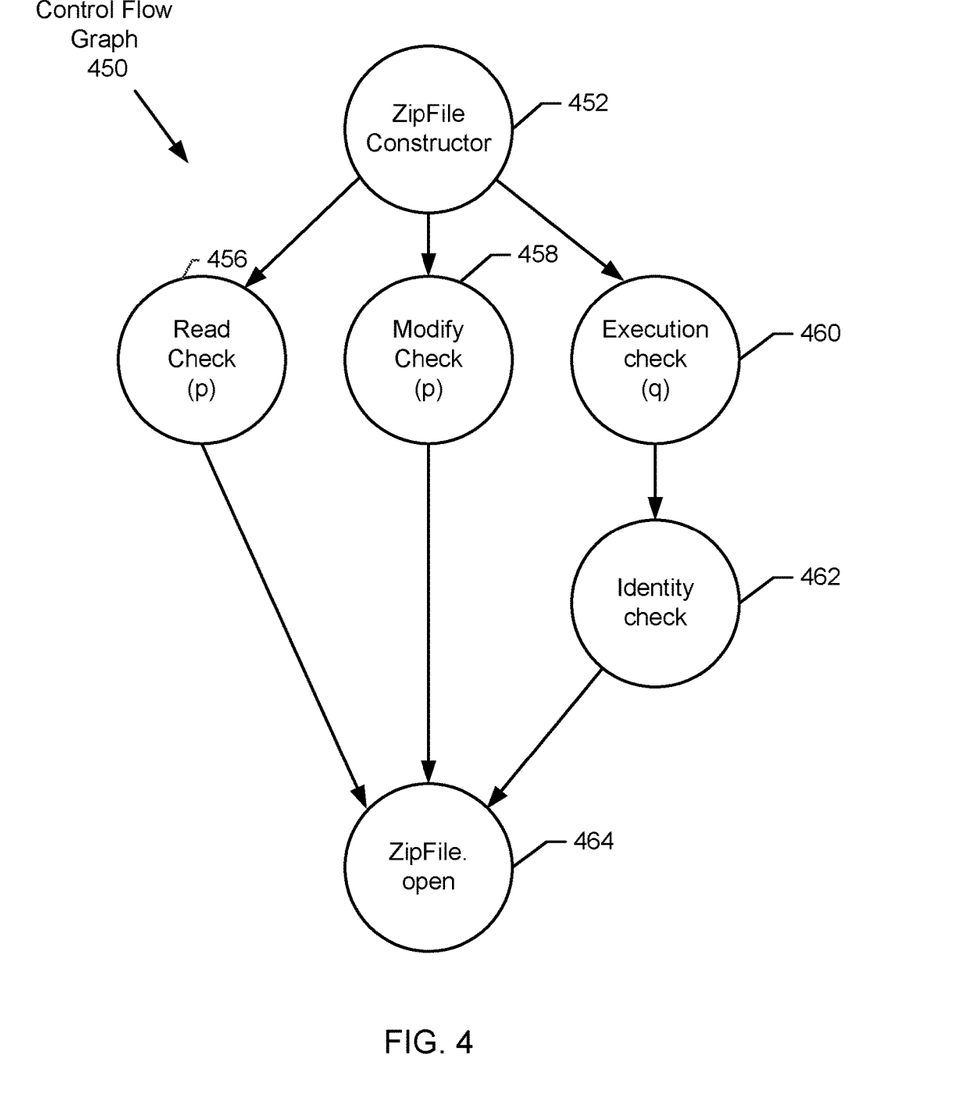
FIG. 4 shows an example in accordance with one or more embodiments of the invention.

FIG. 4 shows an implementation example in accordance with one or more embodiments. First, a software library is obtained and candidate security-sensitive entities are identified. One such candidate security-sensitive entity is the ZipFile.open method (464), as shown in FIG. 4, which illustrates a control flow graph (450) that represents execution paths between a ZipFile constructor method (452) and the ZipFile.open method (464). The ZipFile constructor method (452) is a public entry in the software library that is accessible by application programs external to the software library.

The ZipFile constructor method (452) invokes three other methods, each performing a type of security check: a read check method (456), a modify check method (458) and an execution check method (460). The execution check method (460) also invokes an identity check method (462) (e.g., the identity check method (462) may perform special user authentication steps and/or security analytics). The ZipFile.open method (464) is directly invoked by the read check method (456), the modify check method (458) and the identity check method (462). Both the read check method (456) and modify check method (458) check permission p, while the execution check method (460) checks permission q, and the identity check method (462) does not check any specific permission.

The control flow graph (450) is analyzed to determine whether the candidate security-sensitive entity (the ZipFile.open method (464)) satisfies predetermined proximity and coverage requirements.

Assume that the predetermined proximity level is 2. That is, a candidate security-sensitive entity will be rejected unless there is a permission check within 2 invocations of the candidate security-sensitive entity in each execution path of the control flow graph (450). There are 3 execution paths to the ZipFile.open method (464). In one execution path, the proximity level of the ZipFile.open method (464) is 1 relative to permission p and the read check method (456), since there are no intervening nodes between the read check method (456) and the ZipFile.open method (464). In the second execution path, the proximity level of the ZipFile.open method (464) is also 1 relative to permission p and the modify check method (458), since there are no intervening nodes between the modify check method (458) and the ZipFile.open method (464). In the third execution path, the proximity level of the ZipFile.open method (464) is 2 relative to permission q and the execution check method (460), since there is 1 intervening node (462) between the execution check method (460) and the ZipFile.open method (464). Therefore, all 3 execution paths are within a proximity level of 2, and the candidate security-sensitive entity (the ZipFile.open method (464)) achieves the required proximity level. However, this is conditional on permission p and permission q being equivalent. For example, one or both permissions may be the result of a computation, requiring analysis to determine whether the two permissions are equivalent. If permission p and permission q are not equivalent (e.g., permission p may grant access to the zip file, while permission q may grant general execution access to a file system), then a potential error condition may exist.

Assume that the predetermined coverage level is 0.95. That is, a candidate security-sensitive entity will be rejected unless there is a 95% probability of a permission check guarding the candidate security-sensitive entity in the control flow graph (450). The coverage level is calculated as the sum of the probabilistic factors of the permission check nodes in the control flow graph (450). First, a probabilistic factor of 1 is assigned to the candidate security-sensitive entity node, in this case, the node corresponding to the ZipFile.open method (464). Next, the probabilistic factor is distributed among the 3 predecessor nodes (456, 458, 462) of the ZipFile.open method (464). Thus, each predecessor node (456, 458, 462) is assigned a probabilistic factor of ⅓. Next, the probabilistic factor of the identity check node (462) is distributed to its sole predecessor node (460). Thus, the execution check node (460) is also assigned a probabilistic factor of ⅓. The coverage level is then calculated as the sum of the 3 permission check nodes (456, 458, 460): ⅓+⅓+⅓=1, indicating full coverage of the ZipFile.open method (464). However, this is again conditional on permission p and permission q being equivalent. If permission p and permission q are not equivalent, then the coverage level will fall below the coverage requirement of 0.95 and the candidate security-sensitive entity will be rejected. For example, without including the probabilistic factor of node (460), the coverage level will be ⅔. However, in an alternate scenario where the predetermined coverage level had been 0.6 (instead of 0.95), then the coverage requirement would be satisfied even when the execution check node (460) does not guard the ZipFile.open method (464) relative to permission p. However, the lack of full coverage would result in identifying a potential access control error in the execution path from the ZipFile constructor method (452) to the execution check method (460) to the identity check method (462) to the ZipFile.open method (464), due to the absence of a permission check for permission p.

A similar analysis would be performed for any other candidate security-sensitive entities in the software library (e.g., public methods that contain permission checks, and/or internal methods and fields).

Figure 5A:
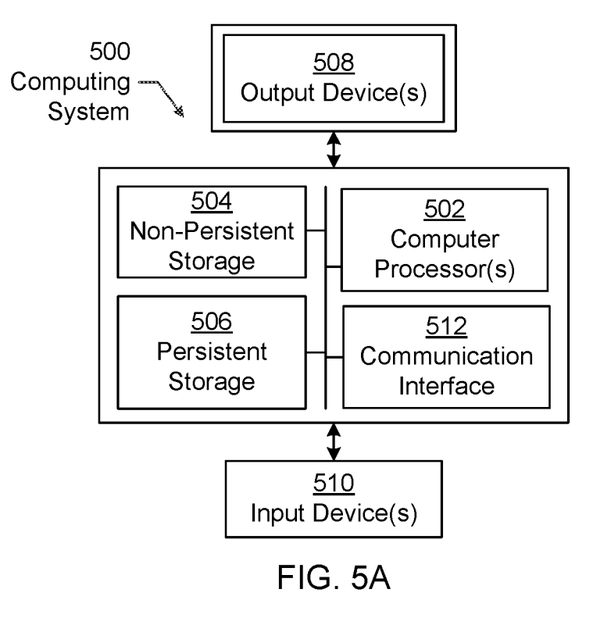
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
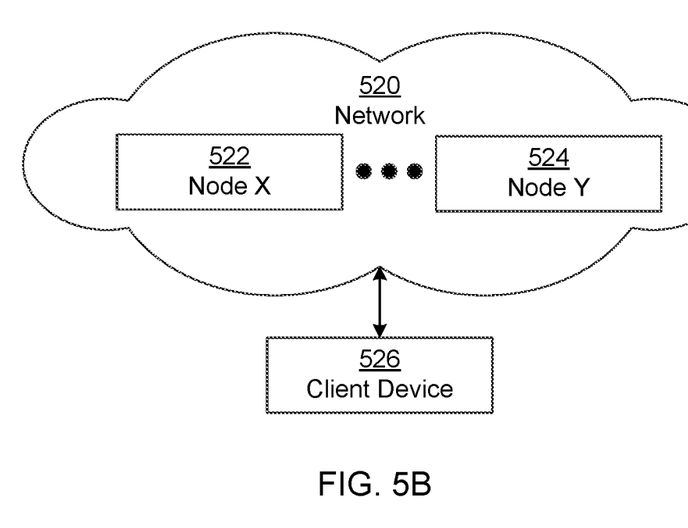

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a software library, comprising:
   obtaining the software library;
   identifying a candidate security-sensitive entity in the software library;
   generating a control flow graph comprising a plurality of execution paths, each execution path comprising a public entry node corresponding to a public entry and a candidate security-sensitive entity node corresponding to the candidate security-sensitive entity, wherein the public entry is a point where an application program external to the software library accesses the software library;
   determining whether each execution path in the control flow graph further comprises a permission check node between the respective public entry node and the candidate security-sensitive entity node in the respective execution path, wherein the permission check node corresponds to a permission check in the software library that checks a value of a permission that controls access to a resource of a computer system comprising the software library;
   calculating a coverage level for the candidate security-sensitive entity node relative to the permission check node, wherein the determination is based on the coverage level exceeding a predetermined value; and
   classifying, based on the determination, the candidate security-sensitive entity as a security-sensitive entity.

2. The method of claim 1, further comprising:
   calculating a proximity level based on a number of nodes between the permission check node and the candidate security-sensitive entity node, wherein the determination is further based on the proximity level not exceeding a predetermined value.

3. The method of claim 1, further comprising:
   calculating a probabilistic factor for each node in the control flow graph,
   wherein the coverage level is based on the probabilistic factor of each permission check node in the control flow graph.

4. The method of claim 3, wherein calculating the probabilistic factor for each node in the control flow graph comprises:
   assigning a probabilistic factor to the candidate security-sensitive entity node; and
   distributing the probabilistic factor of each node in the control flow graph to each predecessor node of the respective node, wherein each predecessor node is connected to the respective node via a direct edge in the control flow graph.

5. The method of claim 1, further comprising:
   identifying a potential access control error when the control flow graph comprises an execution path from the public entry node to the candidate security-sensitive entity node without a permission check node between the public entry node and the candidate security-sensitive entity node; and
   generating an error report indicating the potential access control error relative to the candidate security-sensitive entity.

6. The method of claim 1,
   wherein the candidate security-sensitive entity is inaccessible by an application program external to the software library, and
   wherein the determination is further based on whether each permission check node corresponds to a permission check in the software library that is outside the lexical scope of any privilege elevation statement.

7. The method of claim 1,
   wherein the candidate security-sensitive entity is accessible by an application program external to the software library, and
   wherein the candidate security-sensitive entity comprises a permission check.

8. A system for analyzing a software library, comprising:
   a processor;
   a memory comprising instructions that, when executed by the processor, cause the processor to:
      obtain the software library;
      identify a candidate security-sensitive entity in the software library;
      generate a control flow graph comprising a plurality of execution paths, each execution path comprising a public entry node corresponding to a public entry and a candidate security-sensitive entity node corresponding to the candidate security-sensitive entity, wherein the public entry is a point where an application program external to the software library accesses the software library;
      determine whether each execution path in the control flow graph further comprises a permission check node between the respective public entry node and the candidate security-sensitive entity node in the respective execution path, wherein the permission check node corresponds to a permission check in the software library that checks a value of a permission that controls access to a resource of the system;
      calculate a coverage level for the candidate security-sensitive entity node relative to the permission check node, wherein the determination is based on the coverage level exceeding a predetermined value; and
      classify, based on the determination, the candidate security-sensitive entity as a security-sensitive entity; and
   a repository, configured to store at least the software library and the application program.

9. The system of claim 8, wherein the memory further comprises instructions that, when executed by the processor, cause the processor to:
   calculate a proximity level based on a number of nodes between the permission check node and the candidate security-sensitive entity node, wherein the determination is further based on the proximity level not exceeding a predetermined value.

10. The system of claim 8, wherein the memory further comprises instructions that, when executed by the processor, cause the processor to:

calculate a probabilistic factor for each node in the control flow graph,
wherein the coverage level is based on the probabilistic factor of each permission check node in the control flow graph.

11. The system of claim 10, wherein calculating the probabilistic factor for each node in the control flow graph comprises:
assigning a probabilistic factor to the candidate security-sensitive entity node; and
distributing the probabilistic factor of each node in the control flow graph to each predecessor node of the respective node, wherein each predecessor node is connected to the respective node via a direct edge in the control flow graph.

12. The system of claim 8, wherein the memory further comprises instructions that, when executed by the processor, cause the processor to:
identify a potential access control error when the control flow graph comprises an execution path from the public entry node to the candidate security-sensitive entity node without a permission check node between the public entry node and the candidate security-sensitive entity node; and
generate an error report indicating the potential access control error relative to the candidate security-sensitive entity.

13. The system of claim 8,
wherein the candidate security-sensitive entity is inaccessible by an application program external to the software library, and
wherein the determination is further based on whether each permission check node corresponds to a permission check in the software library that is outside the lexical scope of any privilege elevation statement.

14. The system of claim 8,
wherein the candidate security-sensitive entity is accessible by an application program external to the software library, and
wherein the candidate security-sensitive entity comprises a permission check.

15. A non-transitory computer readable medium comprising instructions that, when executed by a processor, perform a method for analyzing a software library, the method comprising:
obtaining the software library;
identifying a candidate security-sensitive entity in the software library;
generating a control flow graph comprising a plurality of execution paths, each execution path comprising a public entry node corresponding to a public entry and a candidate security-sensitive entity node corresponding to the candidate security-sensitive entity, wherein the public entry is a point where an application program external to the software library accesses the software library;
determining whether each execution path in the control flow graph further comprises a permission check node between the respective public entry node and the candidate security-sensitive entity node in the respective execution path, wherein the permission check node corresponds to a permission check in the software library that checks a value of a permission that controls access to a resource of a computer system comprising the software library;
calculating a coverage level for the candidate security-sensitive entity node relative to the permission check node, wherein the determination is based on the coverage level exceeding a predetermined value; and
classifying, based on the determination, the candidate security-sensitive entity as a security-sensitive entity.

16. The non-transitory computer readable medium of claim 15, wherein the method further comprises:
calculating a proximity level based on a number of nodes between the permission check node and the candidate security-sensitive entity node, wherein the determination is further based on the proximity level not exceeding a predetermined value.

17. The non-transitory computer readable medium of claim 15, wherein the method further comprises:
calculating a probabilistic factor for each node in the control flow graph,
wherein the coverage level is based on the probabilistic factor of each permission check node in the control flow graph.

18. The non-transitory computer readable medium of claim 17, wherein calculating the probabilistic factor for each node in the control flow graph comprises:
assigning a probabilistic factor to the candidate security-sensitive entity node; and
distributing the probabilistic factor of each node in the control flow graph to each predecessor node of the respective node, wherein each predecessor node is connected to the respective node via a direct edge in the control flow graph.

19. The non-transitory computer readable medium of claim 15, wherein the method further comprises:
identifying a potential access control error when the control flow graph comprises an execution path from the public entry node to the candidate security-sensitive entity node without a permission check node between the public entry node and the candidate security-sensitive entity node; and
generating an error report indicating the potential access control error relative to the candidate security-sensitive entity.

20. The non-transitory computer readable medium of claim 15,
wherein the candidate security-sensitive entity is inaccessible by an application program external to the software library, and
wherein the determination is further based on whether each permission check node corresponds to a permission check in the software library that is outside the lexical scope of any privilege elevation statement.

* * * * *